United States Patent
Todd

(10) Patent No.: US 9,292,523 B1
(45) Date of Patent: Mar. 22, 2016

(54) MANAGING DATA STORAGE

(75) Inventor: Stephen J. Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/069,593

(22) Filed: Mar. 23, 2011

(51) Int. Cl.
*G06F 17/30* (2006.01)

(52) U.S. Cl.
CPC .................... *G06F 17/30091* (2013.01)

(58) Field of Classification Search
CPC ............................................ G06F 17/30091
USPC ........................................................ 707/760
See application file for complete search history.

(56) References Cited

U.S. PATENT DOCUMENTS

| | | | |
|---|---|---|---|
| 6,173,306 B1 * | 1/2001 | Raz et al. | 718/102 |
| 7,523,231 B1 | 4/2009 | Gupta et al. | |
| 7,539,813 B1 | 5/2009 | Todd et al. | |
| 7,734,886 B1 * | 6/2010 | Van Riel et al. | 711/163 |
| 2005/0187977 A1 * | 8/2005 | Frost | 707/104.1 |
| 2008/0163237 A1 * | 7/2008 | Ito et al. | 718/104 |

OTHER PUBLICATIONS

Article entitled "The eXtensible Access Method (XAM) Standard", by Todd, published on Oct. 2009.*
Article entitled "EMC Centera Virtual Pools Introduction and Principals of Operation", by EMC, dated Dec. 2009.*
Article entitled "Comparing the XAM API with File System Programming", by Todd, dated Dec. 2006.*
Article entitled "Introduction to XAM", by Horgan, Copyright 2008.*
Article entitled "EMC Centera SDK for XAM", dated Aug. 28, 2008, by Storagezilla.*
U.S. Appl. No. 12/748,566, filed Mar. 29, 2010, Scott R. Ostapovicz, et al.
U.S. Appl. No. 12/893,697, filed Sep. 29, 2010, Stephen J. Todd.

* cited by examiner

*Primary Examiner* — Mahesh Dwivedi
(74) *Attorney, Agent, or Firm* — John T. Hurley; Jason A. Reyes; Krishnendu Gupta

(57) ABSTRACT

Methods, a system, and a program product for use in managing data storage is disclosed. In an embodiment, a method, system, and program product comprises receiving content via an object based storage interface to a data storage system; generating a database insert operation for an object derived from the content, the object having a generated object identifier; and using the database entry operation, storing data associated with the object in a shared-nothing database located within the data storage system, wherein the shared-nothing database is enabled to perform parallel processing across multiple independent nodes.
In another embodiment, a method comprises receiving a delete command for an object via an object based interface to a data storage system; generating a database delete operation for the object based on the delete command; and using the database delete operation, deleting data associated with the object in a shared-nothing database located within the data storage system, wherein the shared-nothing database is enabled to perform parallel processing across multiple independent nodes.
In yet another embodiment, a method comprises receiving a search command via an object based interface to a data storage system; generating a database query based on the search command; and using the database query, querying a shared-nothing database located within the data storage system, wherein the shared-nothing database is enabled to perform parallel processing across multiple independent nodes.

21 Claims, 10 Drawing Sheets

MANAGING DATA STORAGE

TECHNICAL FIELD

The present invention relates to managing data storage.

BACKGROUND

Storage devices are employed to store data that is accessed by computer systems. Examples of basic storage devices include, for example, volatile and non-volatile memory, floppy drives, hard disk drives, tape drives, and optical drives.

Disk drives contain at least one magnetic disk which rotates relative to a read/write head and which stores data nonvolatilely. Data to be stored on a magnetic disk is generally divided into a plurality of equal length data sectors. A typical data sector, for example, may contain 512 bytes of data. A disk drive is capable of performing a write operation and a read operation. During a write operation, the disk drive receives data from a host computer along with instructions to store the data to a specific location, or set of locations, on the magnetic disk. The disk drive then moves the read/write head to that location, or set of locations, and writes the received data. During a read operation, the disk drive receives instructions from a host computer to access data stored at a specific location, or set of locations, and to transfer that data to the host computer. The disk drive then moves the read/write head to that location, or set of locations, reads the data stored there, and transfers that data to the host.

Virtually all computer application programs rely on such storage devices which may be used to store computer code and data manipulated by the computer code. A typical computer system includes one or more host computers that execute such application programs and one or more storage systems that provide storage.

The host computers may access data by sending access requests to the one or more storage systems. Some storage systems require that the access requests identify units of data to be accessed using logical volume ("LUN") and block addresses that define where the units of data are stored on the storage system. Such storage systems are known as "block I/O" storage systems. In some block I/O storage systems, the logical volumes presented by the storage system to the host correspond directly to physical storage devices (e.g., disk drives) on the storage system, so that the specification of a logical volume and block address specifies where the data is physically stored within the storage system. In other block I/O storage systems (referred to as intelligent storage systems), internal mapping technology may be employed so that the logical volumes presented by the storage system do not necessarily map in a one-to-one manner to physical storage devices within the storage system. Nevertheless, the specification of a logical volume and a block address used with an intelligent storage system specifies where associated content is logically stored within the storage system, and from the perspective of devices outside of the storage system (e.g., a host) is perceived as specifying where the data is physically stored.

Block I/O storage systems can be abstracted by utilizing a file system. A file system is a logical construct that translates physical blocks of storage on a storage device into logical files and directories. In this way, the file system aids in organizing content stored on a disk. For example, an application program having ten logically related blocks of content to store on disk may store the content in a single file in the file system. Thus, the application program may simply track the name and/or location of the file, rather than tracking the block addresses of each of the ten blocks on disk that store the content. In general, since file systems provide computer application programs with access to data stored on storage devices in a logical, coherent way, file systems hide the details of how data is stored on storage devices from application programs.

File systems can maintain several different types of files, including regular files and directory files. Files can be presented to application programs through directory files that form a tree-like hierarchy of files and subdirectories containing more files. Filenames are unique to directories but not to file system volumes. Application programs identify files by pathnames comprised of the filename and the names of all encompassing directories. The complete directory structure is called the file system namespace. For each file, file systems may maintain attributes such as ownership information, access privileges, access times, and modification times.

In contrast to block I/O storage systems and file systems, some storage systems receive and process access requests that identify a data unit or other content unit (also referenced to as an object) using an object identifier, rather than an address that specifies where the data unit is physically or logically stored in the storage system. Such storage systems are referred to as object-based storage systems. In object-based storage, a content unit may be identified (e.g., by host computers requesting access to the content unit) using its object identifier and the object identifier may be independent of both the physical and logical location(s) at which the content unit is stored. In some cases, however, the storage system may use the object identifier to inform where a content unit is stored in a storage system. From the perspective of the host computer or user accessing a content unit on an object-based system, the object identifier does not control where the content unit is logically or physically stored. Thus, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of an object-based system is a content addressable storage (CAS) system. In a CAS system, the object identifiers that identify content units are content addresses. A content address is an identifier that is computed, at least in part, from at least a portion of the content of its corresponding unit of content. For example, a content address for a unit of content may be computed by hashing the unit of content and using the resulting hash value as the content address. Storage systems that identify content by a content address are referred to as content addressable storage (CAS) systems.

Data can also be stored and managed in a system by using database management systems (DBMSs). The relational approach to database management typically represents all information as "tables." A "database" can be a collection of tables, each table having rows and columns. In a relational database, the rows of a table may represent records (collections of information about separate items) and the columns may represent fields (particular attributes of a record). In conducting searches, a relational database matches information from a field (column) in one table with information from a corresponding field (column) of another table to produce a third table that combines requested data from both tables.

Databases generally require a consistent structure, termed a schema, to organize and manage the information. In a relational database, the schema can consist of a collection of tables. Similarly, for each table, there is generally one schema to which it belongs. Once the schema is designed, the DBMS is used to build the database and to operate on data within the database. All database management systems can have mechanisms for building databases and operating on data in the database. One such mechanism involves specifying data retrieval operations, often called "queries," to, for example, search the database and then retrieve and display the requested information.

SUMMARY OF THE INVENTION

Methods, a system, and a program product for use in managing data storage is disclosed. In an embodiment, a method, system, and program product comprises receiving content via an object based storage interface to a data storage system; generating a database insert operation for an object derived from the content, the object having a generated object identifier; and using the database entry operation, storing data associated with the object in a shared-nothing database located within the data storage system, wherein the shared-nothing database is enabled to perform parallel processing across multiple independent nodes.

In another embodiment, a method comprises receiving a delete command for an object via an object based interface to a data storage system; generating a database delete operation for the object based on the delete command; and using the database delete operation, deleting data associated with the object in a shared-nothing database located within the data storage system, wherein the shared-nothing database is enabled to perform parallel processing across multiple independent nodes.

In yet another embodiment, a method comprises receiving a search command via an object based interface to a data storage system; generating a database query based on the search command; and using the database query, querying a shared-nothing database located within the data storage system, wherein the shared-nothing database is enabled to perform parallel processing across multiple independent nodes.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Described below is a technique for use in managing data storage. In at least one embodiment in accordance with the current technique, an object-based storage system is implemented using a shared-nothing massively paralleled processing database architecture. This embodiment may, for example, accelerate search operations performed on data objects stored in the object-based storage system.

Figure 1:
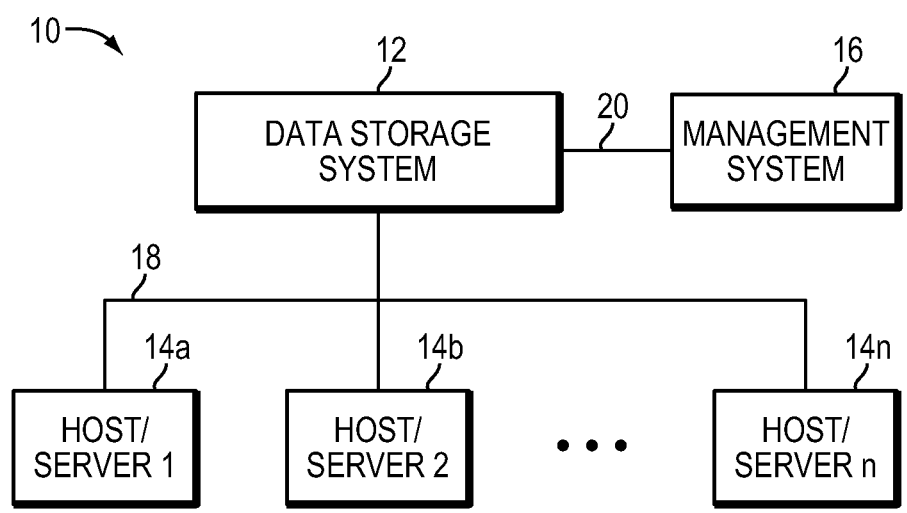
FIG. 1 illustrates an example system that may be used with an embodiment of the technique herein.

Referring to FIG. 1, shown is an example of an embodiment of a system that may be used in connection with performing the technique described herein. The system 10 includes one or more data storage systems 12 connected to server or host systems 14*a*-14*n* through communication medium 18. The system 10 also includes a management system 16 connected to one or more data storage systems 12 through communication medium 20. In this embodiment of the system 10, the management system 16, and the N servers or hosts 14*a*-14*n* may access the data storage systems 12, for example, in performing I/O operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14*a*-14*n* may access and communicate with the data storage systems 12, and may also communicate with other components (not shown) that may be included in the system 10. In one embodiment, the communication medium 20 may be a local area network (LAN) connection and the communication medium 18 may be an Internet Small Computer System Interface (iSCSI) or Fibre channel (FC) connection.

Each of the host systems 14*a*-14*n* and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14*a*-14*n* and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14*a*-14*n*, the management system 16 and data storage systems may all be located at the same physical site, or, alternatively, may also be located in different physical locations. In connection with communication mediums 18 and 20, a variety of different communication protocols may be used such as SCSI, FC, and iSCSI. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a FC connection and the management system may communicate with the data storage systems over a separate network connection using TCP/IP. Although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard and mouse. A data storage system manager may, for example, view information about a current storage volume configuration on a display device of the management system 16.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, can provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or LUNs. Data in a single storage system may be accessed by multiple hosts allowing the hosts to share the data residing therein. A LUN may be used to refer to one of the foregoing logically defined devices or volumes.

What follows is a description of a technique that may be used to help perform data storage services related to, for example, data storage system configuration and provisioning. Among other things, this technique may help improve performance of data operations such as data searching.

Figure 2:
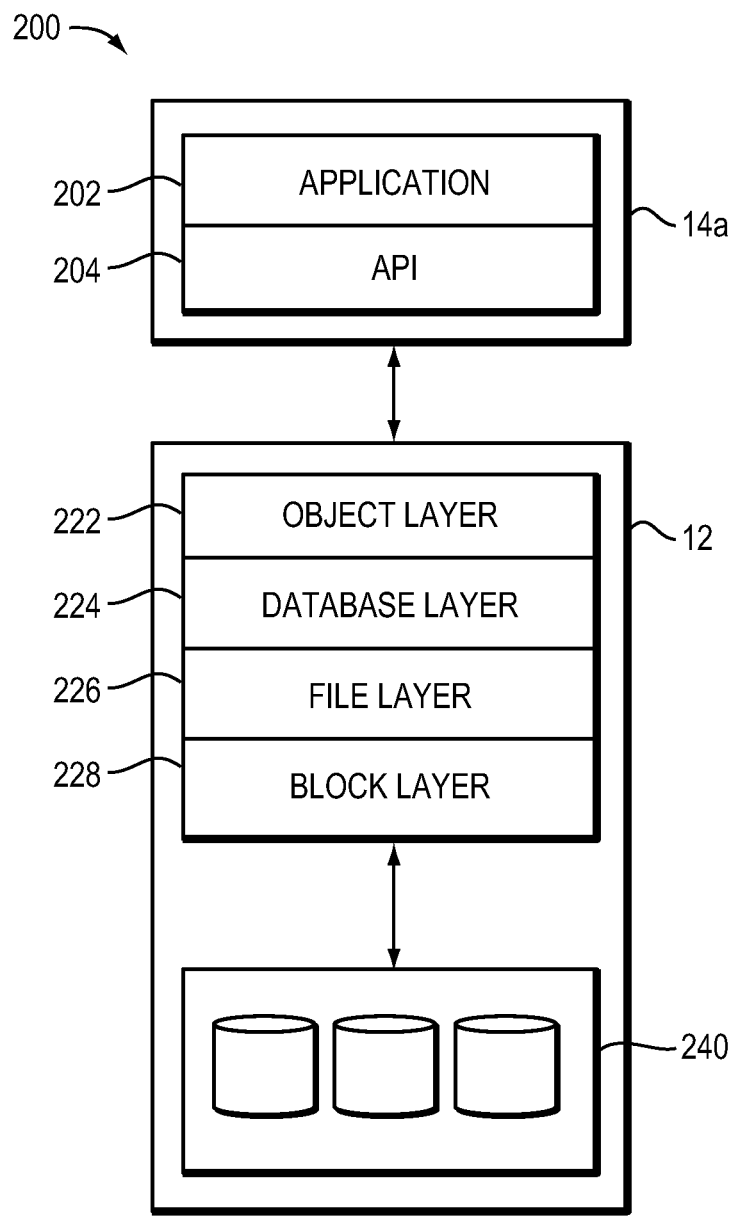
FIG. 2 illustrates components in an example system that may be used with an embodiment of the technique herein.

Referring to FIG. 2, shown is an example embodiment of the current technique. The example 200 includes a host 14a in communication with a data storage system 12. The host 14a may include one or more applications 202 and an application programming interface (API) 204. The data storage system 12 may include software and/or hardware components such as object-based storage layer 222, database storage layer 224, file system storage layer 226, and block storage layer 228, one or more of which may communicate with and provide an interface to storage devices 240. Application 202 executing on the host 14a may be, for example, an email application, a medical office application, or a law office application. The application 202 may communicate with the data storage system 12 using API 204. API 204 may enable application 202 to communicate with the data storage system 12 when issuing data requests (e.g., read, write) via any one or more of layers 222, 224, 226, and 228 executing on the data storage system 12. For example, the API 204 may be code of a software development kit (SDK) for use when interfacing with object-based storage layer 222 to perform operations on data stored on devices 240. In some embodiments, a user may also communicate with data storage system 12 via a graphical user interface (GUI) or a command line interface (CLI) that directly or indirectly utilizes an API and/or any one or more of layers 222, 224, 226, and 228 executing on data storage system 12.

In regards to layers 222, 224, 226, and 228 of data storage system 12, it should be noted that any one of the layers may be implemented using one or more of the other layers and/or other software or hardware technologies not shown in FIG. 2. The example illustrated in FIG. 2 shows object-based storage 222 being implemented directly on top of, or using, database 224. However, in some embodiments, object-based storage 222, or any one or more of the other layers, may be implemented using all or a subset of the other layers and associated technologies. For example, object-based storage 222 may be implemented on top of, or using, a file system 226 instead of database 224. File system 226 may then use functionalities represented by block storage layer 228.

Layers 222, 224, 226, and 228 may be configured in a specific embodiment based on a storage system 12 provisioning and/or configuration request initiated by, for example, a user or a host, such as host 14a. For example, in some embodiments, a provisioning request may require the configuration of underlying storage devices for use by an application. Depending on the embodiment, configuration may be manual and/or automatic. For example, configuration may include the manual or automatic selection of various options associated with layers 222, 224, 226, and 228 and the manual or automatic configuring of one or more storage devices. In at least one embodiment, configuration, which may include, for example, selecting storage system options, configuring any Redundant Array of Inexpensive Disks (RAID) groups, and creating file systems, may be performed in an automated fashion in accordance with best practice for the particular application using data storage system 12, for the type of data being stored in data storage system 12, and/or for the data storage system 12 itself. Also, the best practices and the automation may be customized. For example, the best practices may vary in accordance with the particular application as well as the underlying data storage system and environment. In this automation embodiment, a user need only be exposed to high-level data storage system options. However, a more experienced user of this embodiment may be exposed to additional options and less automation may take place. It should be noted that other levels of application-specific user interaction may also be provided and the knowledge required to perform a data storage configuration operation, such as a provisioning request for a particular application, may vary with each level. Providing different levels of user interaction is further described, for example, in U.S. Pat. No. 7,523,231, entitled APPLICATION AWARE STORAGE, and in U.S. patent application Ser. No. 12/893,697, entitled MANAGING DATA STORAGE FOR DATABASES BASED ON APPLICATION AWARENESS (the '697 application), both of which are hereby incorporated by reference herein.

In a particular embodiment, an application may require data to be stored in data storage system 12 as objects. For example, the data to be stored may be comprised of "fixed-content," or data that will be preserved in its original form without change, such as digital x-rays. In some cases, fixed-content data can be more efficiently stored and accessed using a data storage system provisioned and configured for object-based storage. As discussed above, one example of an object-based system is a content addressable storage (CAS) system, which identifies objects and/or associated metadata by an identifier that is computed, at least in part, from at least a portion of the object data and/or metadata. More information pertaining to objects and associated metadata as well as how objects and associated metadata may be physically and logically organized can be found in the '697 application.

An example object-based system that employs CAS techniques is an eXtensible Access Method (XAM) system. XAM provides a set of standards and a API for storing fixed-content data and metadata on a data storage system so that it can be retrieved by many applications and management software, and so its integrity can be guaranteed and verified.

In an embodiment of the current technique, object-based storage systems such as XAM systems, which are generally designed as data archives or for storing fixed-content data, may be implemented on top of a relational database to provide enhanced functionalities and performance. For example, objects in an object-based system may be more efficiently searched when implemented atop a database that can utilize a query language such as the Structured Query Language (SQL). SQL, and other database query languages, can be used, for example, to quickly request and retrieve information from a database.

Referring again to FIG. 2, host 14a may direct system 12 to provision object-based storage (e.g., CAS/XAM) for an application 202 that requires, for instance, efficient searching of application data. In some embodiments, system 12 provisions storage using configuration settings that are selected by an experienced user. In an example embodiment, a user may select, among other things, to implement CAS/XAM storage with an underlying database with a specific database schema (e.g., structure of database tables). The user may also select, for example, to carve out a specific amount of storage space on one or more types of storage devices that satisfy the needs of the user and/or application and to use mirroring backup for those devices.

In this embodiment, a user may further select how and where CAS/XAM objects are stored in the database. For example, all CAS/XAM objects may be stored in the database or, alternatively, only object metadata is stored in the database. In the latter case, object data may be stored, for example, in a provisioned file system or block storage system. As another example, the user may elect to initially store all object data in a provisioned file system and subsequently migrate data to the database for archiving.

A user in this embodiment may also designate how the database itself is stored. For example, the user may designate the logical devices or files system on which database tables will be stored.

In some embodiments, as discussed above, storage system 12 uses application, data, and/or system best practices that are stored within or available to system 12 for provisioning and configuring storage for application 202. For example, system 12 may provision storage based on application awareness. Using application awareness, system 12 can determine how best to provision and configure system 12 for application 202. For instance, depending on the embodiment, system 12 can automatically implement CAS/XAM storage on top of a database such as that described above. Other selections, such as those made by a user, may also be partially or completely automated by system 12.

In some cases, large-scale data warehousing and analytics capabilities not offered by a conventional database may be desired or necessary for objects stored in system 12. In accordance with an embodiment of the current technique, these capabilities may be delivered by implementing an object-based system atop a shared-nothing massively parallel processing database architecture (MPP database). As described above, provisioning and configuring a data storage system to utilize an object-based system atop a MPP database may be automated or instead controlled by a user.

In this architecture, data is partitioned across multiple independent server nodes. Each node owns and manages a distinct portion of the overall data and can function independently of one another and is self-sufficient. In other words, there is no disk-level sharing, which helps avoid contention among nodes for resources. This shared-nothing architecture can make extensive use of parallelism, distributing processing across all of the independent and self-sufficient nodes. Such an architecture can ingest massive amounts of data, often from multiple data sources, and produce database results that can be used in real or near real-time decision making. Moreover, this architecture is infinitely scalable by adding commodity hardware.

Figure 3:
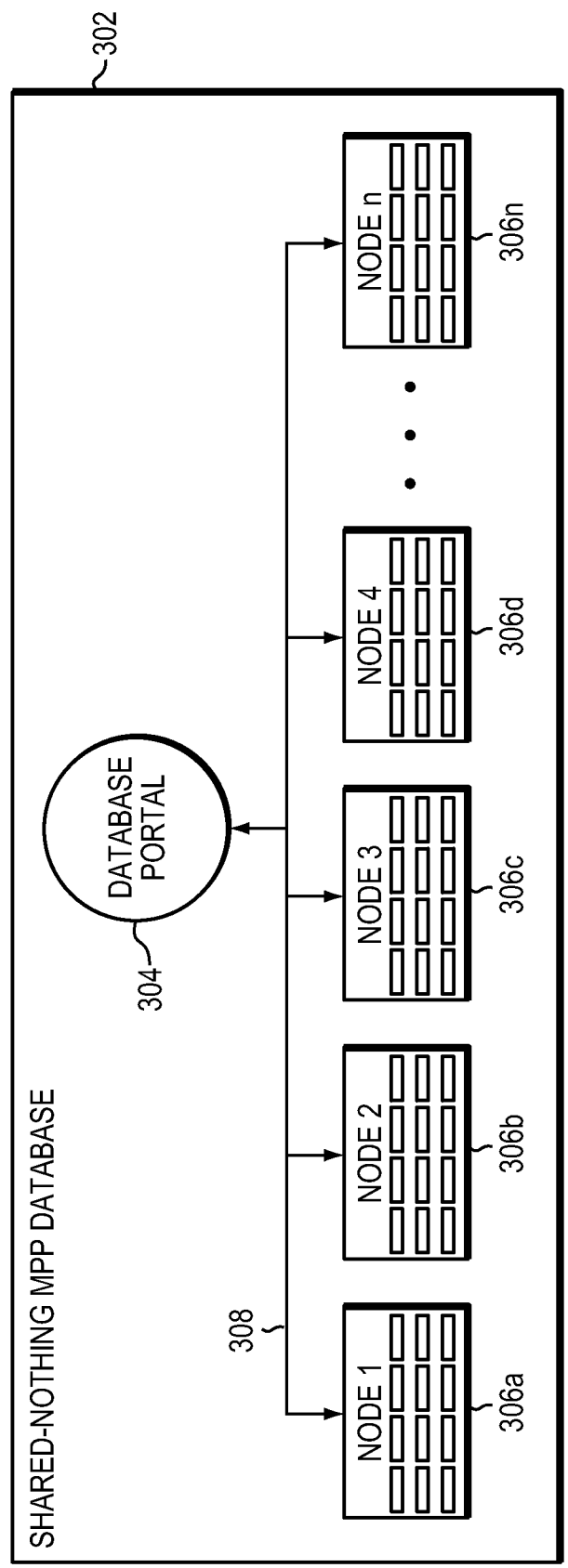
FIG. 3 illustrates an example database that may be used with an embodiment of the technique herein.

Referring to the embodiment of FIG. 3, shown is a simplified illustration of a MPP database 302 that may be included in storage system 12. Database operations (e.g., queries) may be received by and results may be returned by database portal 304. Database portal 304 can communicate with the N nodes 306a-306n via network interconnect 308. In some embodiments, database portal 304 may be included in database layer 224. In an alternative embodiment, database portal 304 may be a separate component with the same and/or different functionalities. In either embodiment, database portal 304 may act as a master node that plans and dispatches operations along network interconnect 308 to the N nodes 306a-306n. Network interconnect 308 may be, for example, repeaters, bridges, switches, and routers. The particular type and number of connections may vary in accordance with particulars of each embodiment. Each node of N nodes 306a-306n may independently and simultaneously store a distinct set of the overall stored data (e.g., in the form of database tables) as well as process database queries. Each node may include a plurality of disk devices or volumes for storing data such as devices 240. Other software and/or hardware components may also be included in an embodiment.

Figure 4:
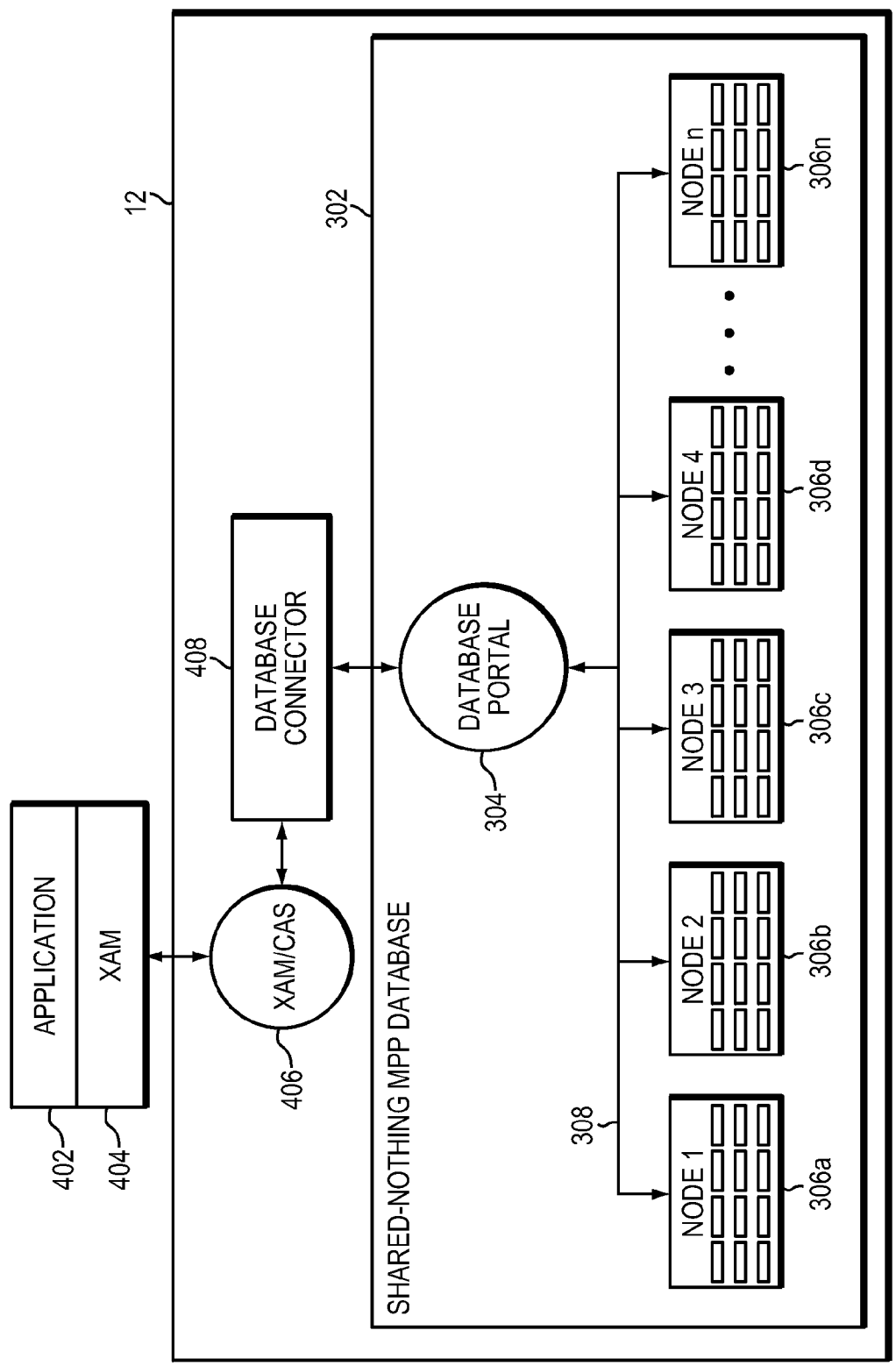
FIG. 4 illustrates the example database of FIG. 3 in an example system that may be used with an embodiment of the technique herein.

Referring to the embodiment of FIG. 4, shown is a data storage system 12 provisioned with a CAS/XAM system implemented atop a MPP database such as MPP database 302 of FIG. 3. In this embodiment, application 402 (e.g., a medical application) may use a XAM API 404 to communicate XAM commands, such as queries, to data storage system 12. XAM commands may be received by and results may be returned by an object layer 222 as described above with reference to FIG. 2 and shown as XAM/CAS 406 in FIG. 4.

In an embodiment such as FIG. 4, where a data object is to be stored using more than one layer (e.g. object layer implemented atop a database layer, file layer, and/or a block layer), data storage system 12 may include a connector component. At the least, a connector component may be a software and/or hardware component responsible for converting an operation of one or more layers into an operation for one or more other layers. For example, as is further described below, database connector 408 of FIG. 4 can convert XAM commands into database operations.

Figure 5:
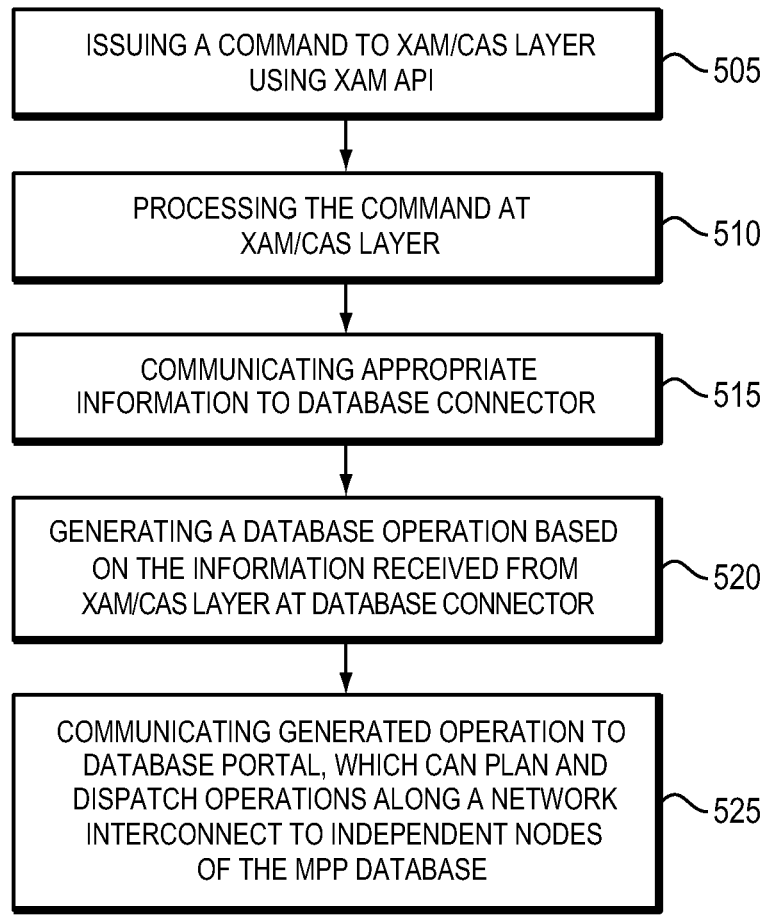
FIG. 5 illustrates a flowchart that may be used with an embodiment of the technique herein.

Referring now to FIG. 5, shown is a flow diagram illustrating steps that may be used with an embodiment of the current technique in which a command is issued to a XAM data storage system implemented atop a MPP database, as described above.

Figure 6:
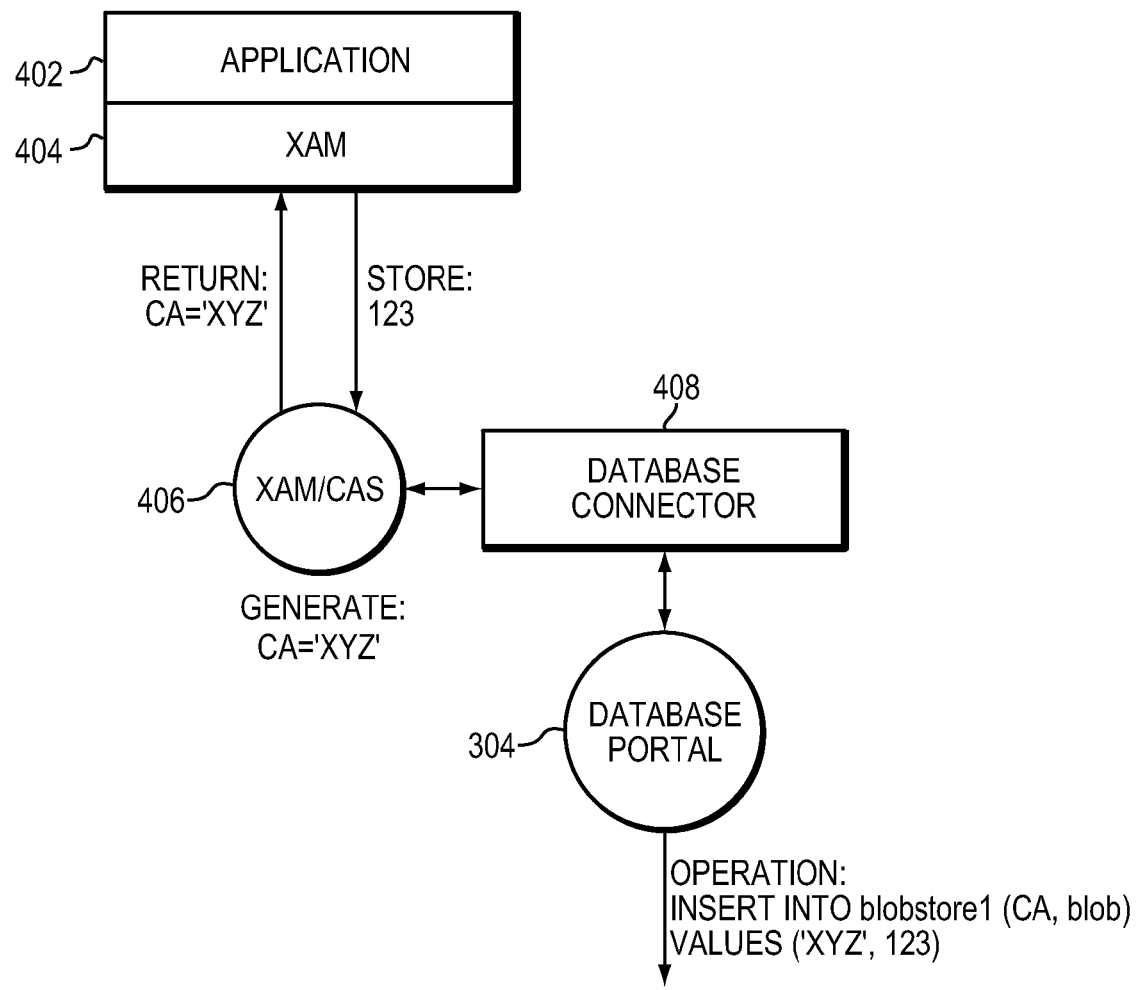
FIGS. 6-8 illustrate database operations that may result from object commands in an example system that may be used with an embodiment of the technique herein.

In step 505, application 402 may issue a command to XAM/CAS layer 406 using XAM API 404. As one example, application 402 may issue a data write command for a large data object, or "blob." As another example, application 402 may issue a data write command for a metadata object. An illustration of the steps of FIG. 5 for a write command is shown in FIG. 6.

In steps 510 and 515, XAM/CAS layer 406 processes the command and communicates appropriate information to database connector 408. For example, when receiving a write command, XAM/CAS layer 406 may generate a content address (CA) for the received data and communicate the received data and its CA to database connector 408. In some embodiments, XAM/CAS layer 406 may also communicate instructions to connector 408 such as, for example, instructions as to how to handle the received write command and associated XAM object. In at least one embodiment where a write command is received by XAM/CAS layer 406, only a portion of the received data is communicated to database connector 408 for storage within the database. For example, due to user or application-aware storage system configuration, XAM/CAS layer 406 may designate that metadata be stored in the database and that the associated data be stored in a file system. In this example, one or more additional connectors or other components not shown may also be needed in system 12.

In step 520, database connector 408 can generate a database operation based on the information received from XAM/CAS layer 406. For instance, in response to a XAM write command, the following operation may be generated for inserting a blob with generated CA "XYZ" and blob data value 123 into the database:

INSERT INTO blobstore1 (CA, blob)
VALUES ('XYZ', 123);

In some embodiments, additional steps may be performed before inserting data into the database. For example, database connector 408 may receive metadata, with generated CA "ABC," formatted using the Extensible Markup Language (XML). As an illustrative example, connector 408 may receive the following metadata in XML format:

<Month>January</Month><Year>2005</Year>
<Month>March</Month><Year>2008</Year>
<Month>June</Month><Year>1998</Year>

In this illustrative example, to be able to efficiently query the database for data based on a month and/or year, rather than just by a CA, an initial step of parsing the metadata to determine the appropriate month and year values to be inserted into a database table that contains month and year attributes may be required. Once the appropriate values have been determined, the following operation may be generated by database connector 408:

INSERT INTO metastore1 (CA, Month, Year, Month, Year, Month, Year)
VALUES ('ABC', 'January', '2005', 'March', 2008, 'June', '1998');

In step 525, the generated operation is communicated to database portal 304, which can, in some embodiments, plan and dispatch operations along a network interconnect to independent nodes of the MPP database, as described above with reference to FIG. 3. For instance, in response to an insert operation, one or more independent server nodes may be selected for inserting received information.

Figure 7:
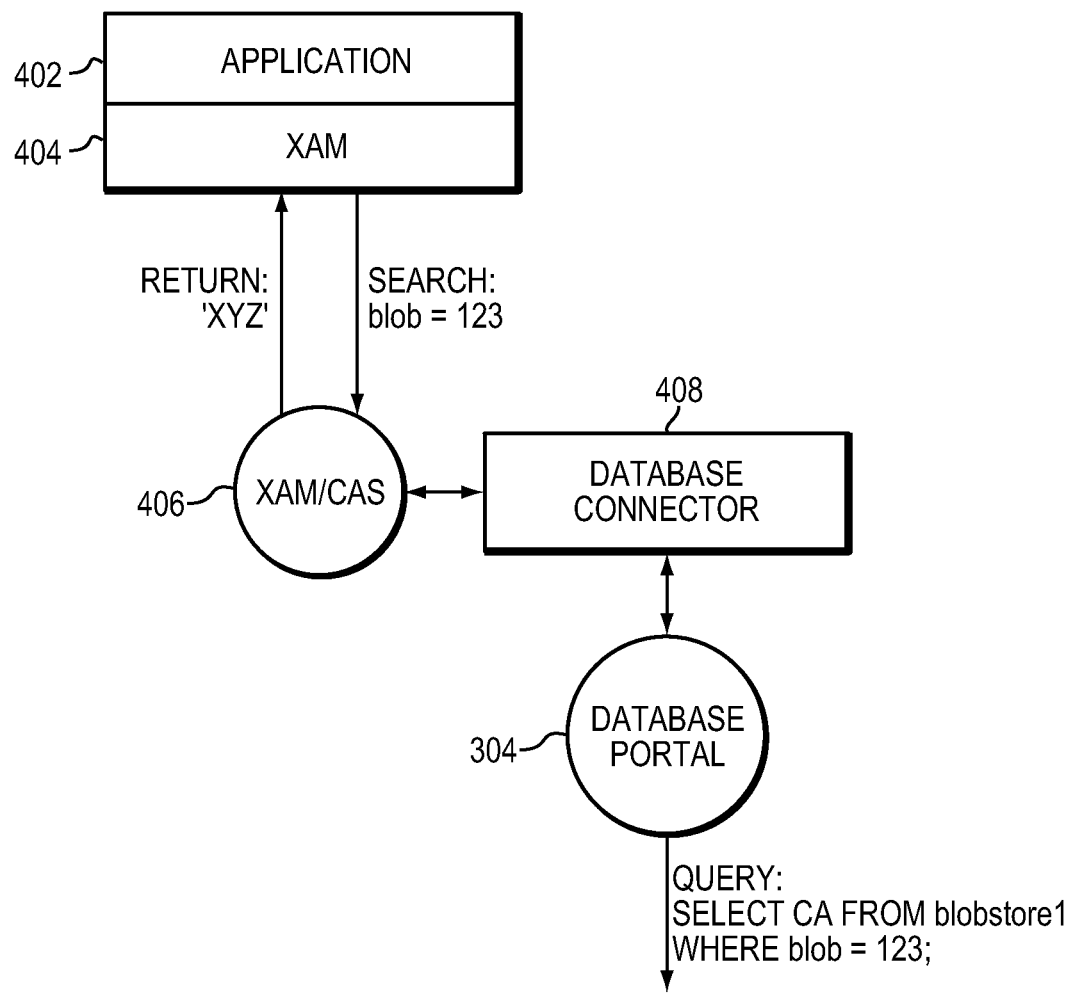
Figure 8:
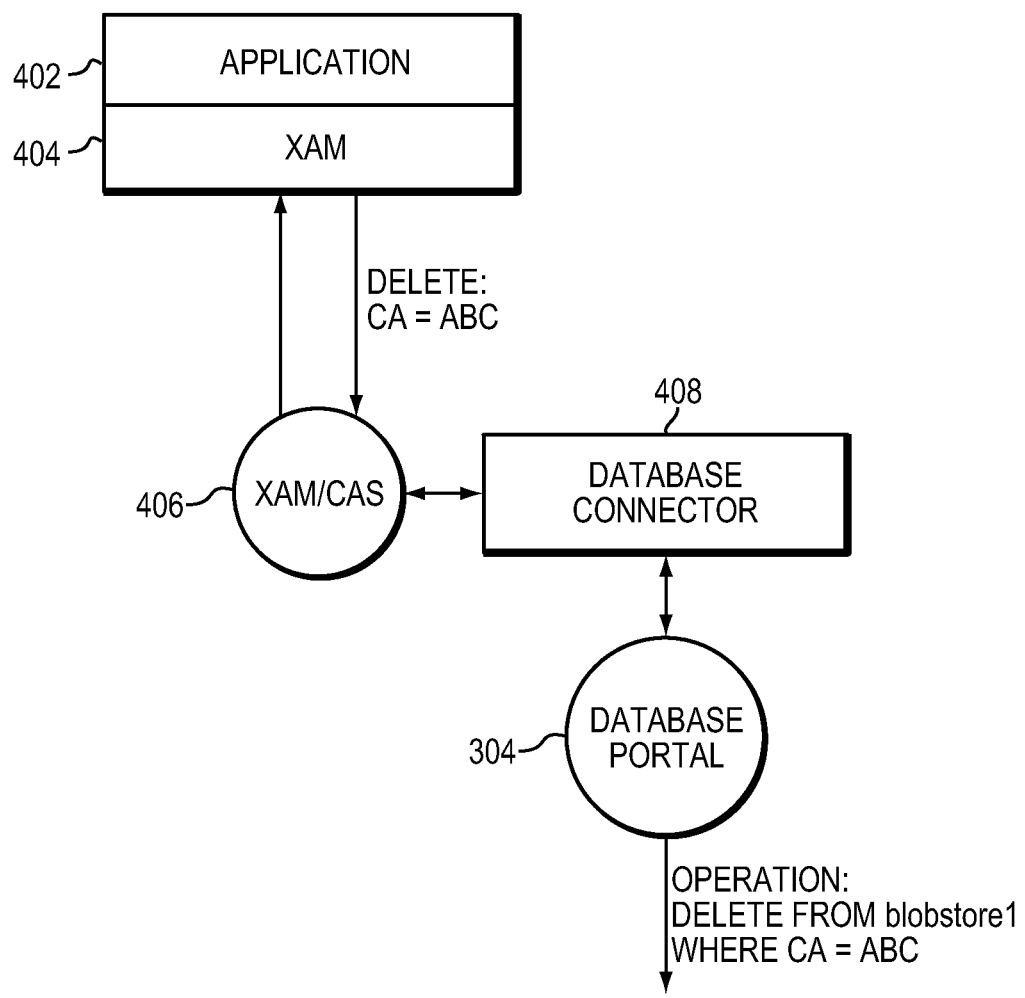

In addition to converting an object-based write operation into a shared-nothing MPP database operation, the steps of FIG. 5 are also applicable to other operation conversions in an embodiment of the current technique. For instance, as illustrated by FIG. 7, a XAM search operation can be converted into a MPP database select operation. As a further example, as illustrated by FIG. 8, a XAM delete operation can be converted into a MPP database delete operation.

In some embodiments, steps in addition to those shown in FIG. 5 may be performed as required. For example, certain operations, such as a search/select operation, may require data to be returned to the application 402 that issued the operation command. In this embodiment, database connector 408 may receive and convert database query results into XAM results for communication back to the application 402. For instance, if the steps of FIG. 5 are performed in response to application 402 issuing a XAM search command to data storage system 12, a XAM response can be generated by connector 408 using information collected by the database select operation performed on the MPP database.

It should also be noted that when configuring and provisioning object-based storage atop an MPP database for use with an application, the application may be allowed to perform data storage operations on objects or data included in one or more virtual pools. As such, a virtual pool may be configured for use with an application as part of processing a request to provision storage for the application. A virtual pool or virtual object pool may correspond to a logical segregation or partitioning of the object space. An embodiment may give particular applications access to one or more specific virtual pools containing data for the particular applications. For example, for security and compliance reasons, a medical application may not be allowed to access financial information used by a mortgage application, and vice versa. Furthermore, for a given virtual pool, different types of access and operations may be allowed for a specified application. Thus, part of virtual pool configuration may include specifying attributes related to what application(s) on what host(s) are allowed access to one or more specified virtual pool and also what types of access (e.g., read-only, read existing objects and write new objects, modification to existing object attributes) are permitted. For example, a first virtual pool may contain general information used by both the medical and mortgage applications and both such applications may only be allowed read access to objects included in the first virtual pool. A second virtual pool may contain data used only by the medical application and the medical application is allowed to read and write new objects to the second virtual pool. A third virtual pool may contain data used only by the mortgage application and the mortgage application is allowed to read and write new objects to the third virtual pool. Thus, virtual pools may be used to facilitate data security and compliance, which may, for example, be controlled by object layer 222 or database layer 224.

To help satisfy data compliance laws and regulations, a retention class may be defined for an application's virtual pool specifying, for example, an amount of time that an object or objects within a virtual pool is to be retained (e.g., an amount of time that object deletion is disallowed). An object may have one or more attributes and one such attribute may identify a retention class. Specifications of a particular retention class may be stored, for example, as metadata when a new object is created. The object layer and/or a lower layer (e.g., database layer 224) may be responsible for enforcing the retention class specifications. Also, an existing object may be modified to specify a selected retention class attribute or an existing retention class attribute may be modified. A user may be allowed to define a new retention class where the class definition indicates a particular retention time. A user may also be allowed to modify an existing definition for a defined retention class. For example, a first retention class may be defined specifying a 7 year retention time in accordance with existing laws and regulations at a first point in time related to how long a medical office is required to retain patient medical records and data. At a second point in time, there may be a law change so that the required retention time is now 10 years. As such, a user may be allowed to modify the retention time for the first retention class and all existing and new objects having the first retention class attribute may automatically have an updated retention time from 7 to 10 years. In some embodiments, a retention class for an application may be automatically created or specified by a user. In this embodiment, when an object is to be stored in the application's virtual pool, one or more layers may cause the data to be automatically tagged with a retention class attribute.

In some embodiments, data security features may also be implemented for data objects and/or virtual pools. For instance, a user may select, or it may automatically be selected based on awareness principles discussed above, to permanently delete, or "shred," data of an object upon the occurrence of a particular event such as, for example, a date, so that the data is unrecoverable. As with data retention, shredding specification may be applied and enforced by one or more layers (e.g., object layer 222 or database layer 224). Also, a virtual pool may have a shredding specification associated with it.

Having different application(s) access specified virtual pools may be used in connection with performing capacity analysis (e.g., how much storage is being used by the medical application or email application). To this end, objects to be written to a particular virtual pool may have their metadata fields automatically populated with information identifying, for instance, the particular application, host writing the data, and corporate division or hospital owning the particular application storing the object.

Although virtual object pools may be implemented independent of, and using any desired, underlying physical storage devices and technologies, additionally processing is performed to configure the underlying storage devices for use in storing objects. In other words, virtual pool configuration may also include performing processing required to establish, allocate, or set up the storage of the virtual pool for consumption by the application. Such processing may include, for example, selecting various options associated with database layer 224, file layer 226, and block layer 228 upon which the object-based storage is implemented, creating one or more databases or database tables, creating one or more file systems, and configuring one or more storage devices to have a desired RAID level of protection. In one embodiment, selection of database options, file system options, and block storage options, as well as configuring any RAID groups, creating databases or database tables, and creating file systems, may be performed in an automated fashion in accordance with best practices for the particular application using the virtual pool. Thus, one embodiment may not expose details regarding the database layer 224, file layer 226, and block layer 228 when a user issues a request to configure storage for an application. Rather, in this embodiment, only details of the object layer 222 and functionality related to objects may be exposed to the user and automated in varying levels. In another embodiment, the different levels of user interaction and associated skill may expose varying levels of detail of the object layer 222 and, optionally, one or more other lower layers (such as of the database layer 224).

Figure 9:
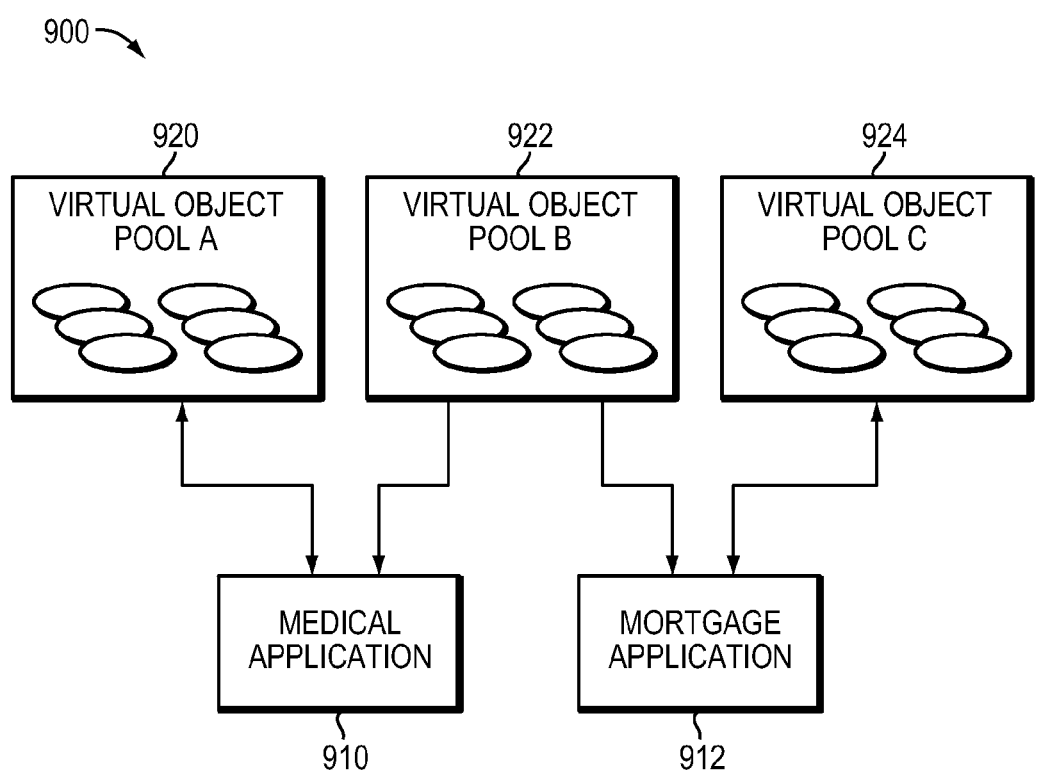
FIGS. 9 and 10 illustrate example virtual pools that may be used in an embodiment of the technique herein.

Referring to FIG. 9, shown is an example illustrating virtual pools as may be used in an embodiment described herein. The example 900 illustrates object space comprising three virtual pools 920, 922 and 924. The medical application 910 may have access to pools 920 and 922 and the mortgage application may have access to pools 922 and 924. Pool 922 may represent the common or shared data of the applications 910 and 912. Pool 920 may represent data accessible only to the medical application 910. Pool 924 may represent data accessible only to the mortgage application 912. The example 900 illustrates segregating virtual pools based on application usage. However, as will be appreciated by those of ordinary skill in the art, the logical partitioning of object space into one or more virtual pools may be performed based on the foregoing and/or other criteria.

Figure 10:
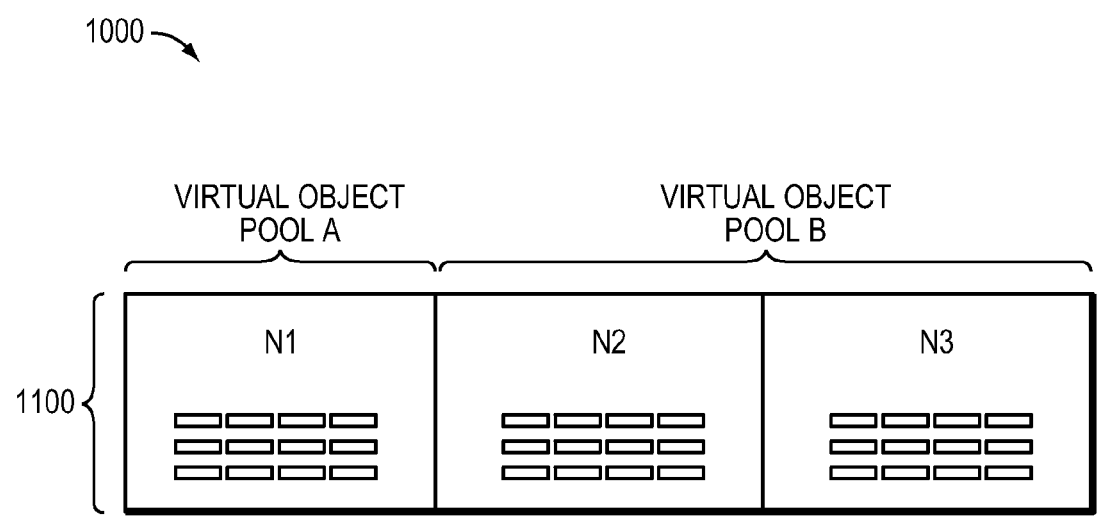

Referring now to FIG. 10, shown is an example illustrating how virtual object pools may be configured in an embodiment in accordance with the technique described herein. The example 1000 illustrates an embodiment in which virtual pool A and virtual pool B are implemented using a MPP database as described above. Element 1100 indicates that virtual object pool A consists of a single independent server node, N1, and that virtual object pool B consists of two independent server nodes, N2 and N3. As illustrated in FIG. 9, virtual pool A may be used by only the medical application and may be configured using a single independent server node in accordance with the medical application best data storage practices. The single server node may include devices provisioned and configured using a file system of a type selected in accordance with the medical application best data storage practices. For example, if the medical application typically has large files over a particular size and the data is typically accessed infrequently (e.g., no more than once every year or other specified time period), the file system may be of a type particularly suitable for operating on files of at least the particular size and which is accessed infrequently. Underlying storage devices may also be provisioned and configured based on best practices.

As also illustrated in FIG. 9, virtual pool B may be used by both the medical application and mortgage application and may be configured using two independent server nodes in accordance with the best data storage practices for the data to be stored. The nodes may include devices provisioned and configured using one or more file systems of a type(s) selected in accordance with the best data storage practices for the data to be stored. For example, if the common or shared data stored in virtual object pool B is frequently accessed and typically includes a large number of small files under a particular size, the file systems may be of a type particularly suitable for operating on such files. Underlying storage devices may also be provisioned and configured based on best practices.

A more detailed description of virtual pools can be found in U.S. Pat. No. 7,539,813, entitled "Methods and Apparatus for Segregating Content Addressable Computer Systems," by Stephen Todd, et al., which is hereby incorporated by reference herein.

An embodiment may implement the techniques herein using code executed by a computer processor. For example, an embodiment may implement the techniques herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing data storage, the method comprising:
    receiving content via an object layer of an object based storage interface to a data storage system having a file layer, wherein the data storage system includes an object-based system implemented atop a shared-nothing relational database having a database layer;
    communicating the received content to a database connector;
    generating a database insert operation for an object derived from the content, the object having a generated object identifier, wherein generating the data insert operation includes converting an associated object based storage interface command into a corresponding shared-nothing database insert operation, wherein converting includes converting an object layer operation into an operation for the database layer, wherein the object layer operation is an XAM operation and the operation for the database layer is an SQL operation; and
    using the database insert operation, inserting data associated with the object in the shared-nothing relational database located within the data storage system, wherein the shared-nothing relational database is enabled to perform parallel processing across multiple independent nodes.

2. The method of claim 1, wherein the object based interface is an eXtensible Access Method interface.

3. The method of claim 1, wherein the data storage system comprises a database based storage interface, a file system based storage interface, and a block based storage based interface.

4. The method of claim 1, wherein the data associated with the object is comprised of metadata.

5. The method of claim 1, wherein the object derived from the content is stored in the data storage system before a database insert operation is generated.

6. The method of claim 1, wherein the shared-nothing database is comprised of virtual pools.

7. The method of claim 6, wherein at least one of the virtual pools is associated with an application.

8. The method of claim 6, wherein a security feature is associated with at least one of the virtual pools.

9. The method of claim 8, wherein the security feature is data shredding.

10. The method of claim 6, wherein a retention class is associated with at least one of the virtual pools.

11. A system for use in managing data storage, the system comprising a processor configured to:
    receive content via an object layer of an object based storage interface to a data storage system having a file layer, wherein the data storage system includes an object-based system implemented atop a shared-nothing relational database having a database layer;
    communicate the received content to a database connector;
    generate a database insert operation for an object derived from the content, the object having a generated object identifier, wherein generating the data insert operation includes converting an associated object based storage interface command into a corresponding shared-nothing database insert operation, wherein converting includes converting an object layer operation into an operation for the database layer, wherein the object layer operation is an XAM operation and the operation for the database layer is an SQL operation; and
    insert, using the database insert operation, data associated with the object in the shared-nothing relational database located within the data storage system, wherein the shared-nothing relational database is enabled to perform parallel processing across multiple independent nodes.

12. The system of claim 11, wherein the object based interface is an eXtensible Access Method interface.

13. The system of claim 11, wherein the data storage system comprises a database based storage interface, a file system based storage interface, and a block based storage based interface.

14. The system of claim 11, wherein the data associated with the object is comprised of metadata.

15. The system of claim 11, wherein the object derived from the content is stored in the data storage system before a database insert operation is generated.

16. The system of claim 11, wherein the shared-nothing database is comprised of virtual pools.

17. The system of claim 16, wherein at least one of the virtual pools is associated with an application.

18. The system of claim 16, wherein a security feature is associated with at least one of the virtual pools.

19. The system of claim 18, wherein the security feature is data shredding.

20. The system of claim 16, wherein a retention class is associated with at least one of the virtual pools.

21. A computer program product for use in managing data storage, the computer program product comprising a non-transitory computer-readable medium having machine readable code embodied therein for:
    receiving content via an object layer of an object based storage interface to a data storage system having a file layer, wherein the data storage system includes an object-based system implemented atop a shared-nothing relational database having a database layer;
    communicating the received content to a database connector;
    generating a database insert operation for an object derived from the content, the object having a generated object identifier, wherein generating the data insert operation includes converting an associated object based storage interface command into a corresponding shared-nothing database insert operation, wherein converting includes converting an object layer operation into an operation for the database layer, wherein the object layer operation is an XAM operation and the operation for the database layer is an SQL operation; and using the database insert operation, storing data associated with the object in the shared-nothing relational database located within the data storage system, wherein the shared-nothing relational database is enabled to perform parallel processing across multiple independent nodes.

\* \* \* \* \*